May 22, 1951  F. F. LAVELL  2,554,255
MEAT FORK

Filed Oct. 4, 1946  2 Sheets-Sheet 1

INVENTOR
Frederick F. Lavell
BY
ATTORNEYS

May 22, 1951     F. F. LAVELL     2,554,255
MEAT FORK
Filed Oct. 4, 1946     2 Sheets-Sheet 2
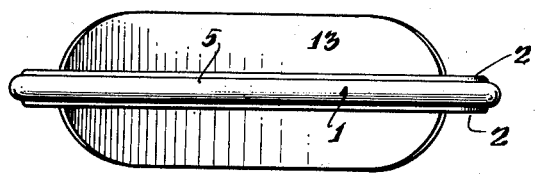
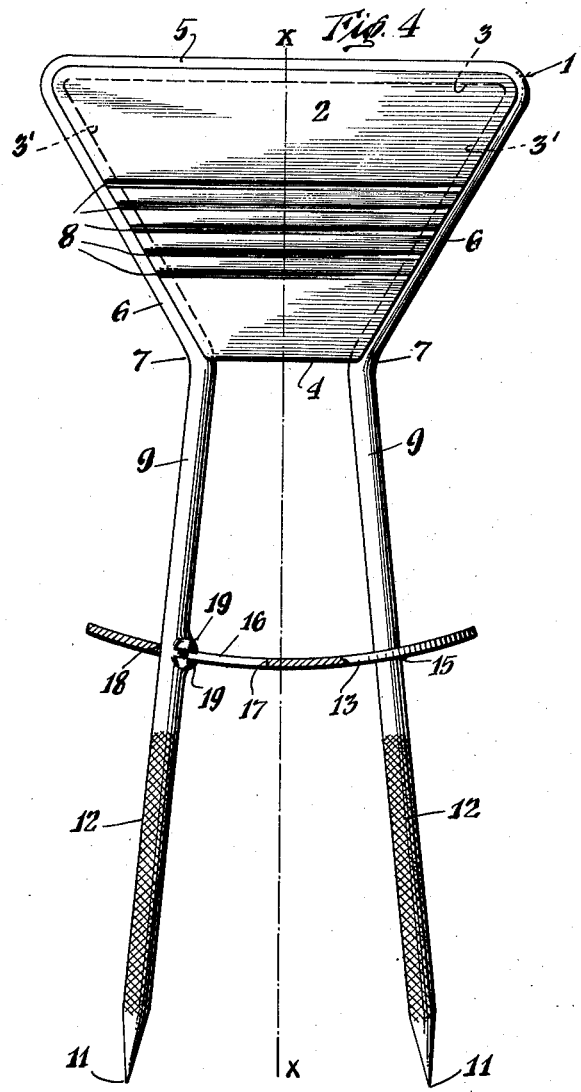
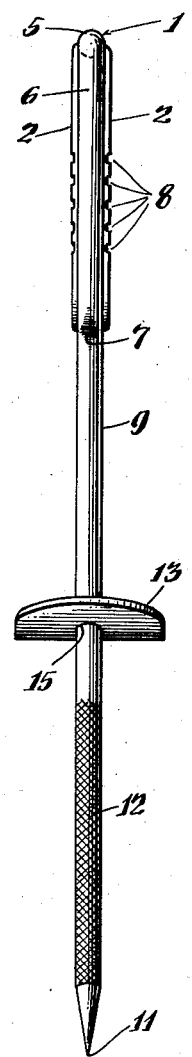
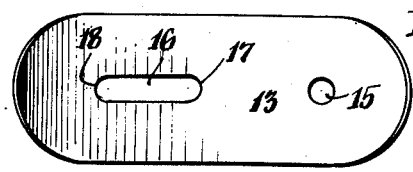
INVENTOR
Frederick F. Lavell
BY
Austin, Wilhelm & Carlson
ATTORNEYS Patented May 22, 1951

2,554,255

UNITED STATES PATENT OFFICE 2,554,255

MEAT FORK

Frederick F. Lavell, Westfield, N. Y.

Application October 4, 1946, Serial No. 701,375

3 Claims. (Cl. 30—322)

This invention relates to an improved meat fork useful in handling and holding meats and the like prior to, during, and after slicing or carving.

Meat forks commonly used in carving roasts, hams, or other meat chunks consist of a handle to which is attached a fork blade presenting two or more rigid tines. The fork tines of such meat forks have a tendency to slip from the meat and fail to achieve a firm grip on the meat chunk during handling and carving, making necessary a repuncture of the meat with the fork tines, causing inconveniences and irregularities in carving.

An object of this invention is to provide an improved meat fork which, when driven into the meat chunk will hold the meat firmly and securely, and yet permit easy withdrawal of the fork tines without tearing or deforming the meat.

Other objects and advantages of this invention will become apparent as the disclosure proceeds.

In accordance with this invention, an improved meat fork is provided which presents a handle forming section and a pair of resilient metal tine forming legs extending from the handle forming section. In the preferred form of the invention, the handle section and the leg forming tines are shaped and formed from a one piece metal rod, the mid-section of the rod being shaped to provide a handle section of generally U shape form defining a top portion and a pair of side portions. The side portions of the handle section taper to a knee point, with the tine forming legs extending from the knee point in a normally outwardly flared position. The tine forming legs are set to retain a normally outwardly flared position, each leg flaring from the center line of the fork at an angle of from 5° to 15°. The legs of the fork may be smoothed and polished, or may be knurled or roughened to achieve an increased grip on the meat chunk, the free end of each leg being sharpened so as to easily penetrate the meat chunk.

The fork legs may also carry a guard plate which provides a guard or shield to protect the hand and the fingers from contact with the meat. It will be appreciated that the guard plate is so constructed as not to interfere with the resilient flaring movement of the tine forming legs, and so that the lower portions of the legs may penetrate the meat for a substantial distance and to the point where the guard plate seats against the meat chunk.

The handle section may, if desired, be shaped to embrace an inset handle block formed of plastic, wood, metal or other material, the handle section of the rod fitting tightly into a top groove and a pair of side grooves in the handle block. The side portions of the U-shaped handle section may be sprung into the side grooves of the handle block to thereby firmly grip and hold the handle block in assembled locked position.

Although the characteristic features of the invention will be particularly pointed out in the claims appended hereto, the invention itself, and the manner in which it may be carried out, may be better understood by referring to the following description taken in connection with the accompanying drawings forming a part hereof, in which Fig. 1 is a perspective view of the improved fork showing the tine forming legs thereof embedded in a chunk of meat.

Fig. 3 is a top view of the improved fork;

Fig. 4 is a front elevational view of the fork;

Fig. 5 is a side elevational view of the fork; and Fig. 6 is a top view of the guard plate which is attached to the tine forming legs.

Similar reference characters refer to similar parts throughout the several views of the drawings and specification.

Figures 1, 2:
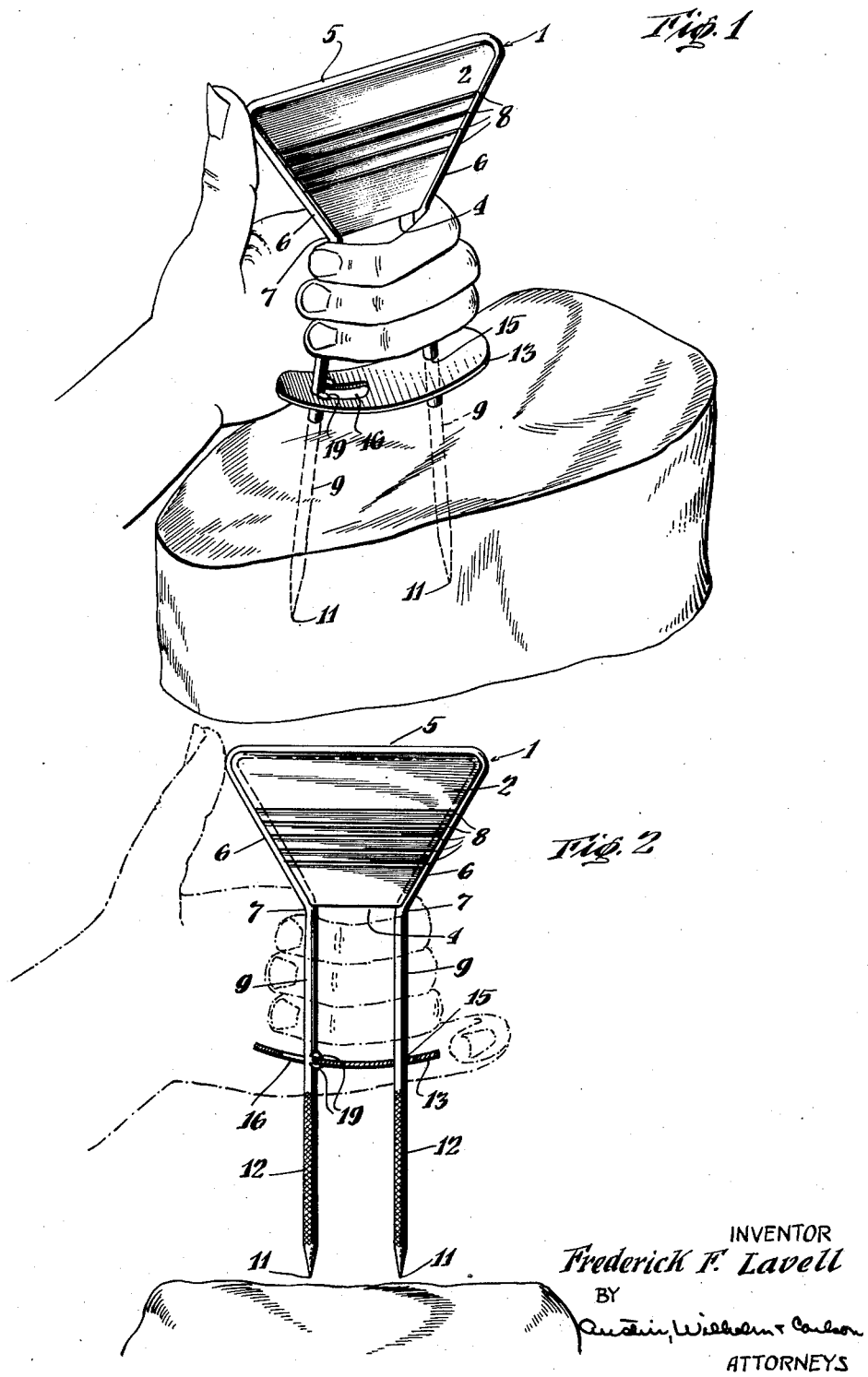
Fig. 2 is a perspective view of the improved fork showing the manner in which the tine legs are compressed preparatory to embedding the legs in the meat.

The improved meat fork forming the subject matter of this invention may be economically made from a metal rod desirably formed of spring metal, such as stainless steel or spring steel, which may be chrome, nickel or silver plated. The rod may be polygonal or circular cross section, with a diameter of approximately ⅛ of an inch to ⅜ of an inch and a total length of approximately eighteen inches to thirty-six inches, depending upon the size and weight of the fork desired. A handle block 2 may be set within the handle forming section of the rod as firmly formed, and may be made of wood, plastics, or other hard and strong material which presents a sanitary surface. The third element of the meat fork comprises a guard plate 3 which may be formed of plastic resins, or a metal which is suitably plated to present a chrome, nickel, or silver finish.

The handle block which is designed to seat within the handle section of the formed rod, may be made of any convenient thickness which will provide a comfortable hand hold. The handle block 2 presents substantially parallel top and bottom edges and sloped or inclined side edges. A conforming groove 3 is formed in the top horizontal edge of the handle block and corresponding conforming grooves 3' are formed in the side edges of the handle block. The conforming grooves 3 and 3' are designed to receive and encase the base portion 5 and the side portions 6 of the handle section of the fork forming rod. The side faces of the handle block may present any desired decorative indentations 8 to give the complete fork an attractive and pleasing appearance.

The fork forming rod 1, suitably finished or plated to give the same an attractive appearance and a sanitary exterior surface, may be shaped to provide a handle section of generally U-shaped configuration; and may be so treated and formed that the base portion 5 and the side portions 6 thereof will snugly fit within the formed grooves 3 and 3' of the handle block and exert a resilient clamping grip thereon. This characteristic can be simply achieved during manufacture since the fork forming rod is formed of resilient metal.

The side portions 6 of the U-shaped handle section terminate at a knee point 7 approximately adjacent the lower edge 4 of the handle block. The tine forming legs extend from the knee point 7 in a straight line so as to present outwardly flared tine forming legs having a convenient length of six inches to nine inches. It will be noted that in the normal position as shown in Fig. 4, each on the legs 9 flare outwardly from the knee point 7 thereof to the lower end thereof with respect to the mid-sectional line X at an angle of from 5° to 15°, and preferably at an angle of from 7° to 10°. The rod metal may, if necessary, be set by heat treatment so that the legs 9 will normally retain this flared position. The lower free end 11 of each leg 9 is tapered to a pencil point, each tine forming leg being preferably roughened, knurled or grooved as at 12 to further insure a frictional grip on the penetrated meat.

The guard plate 13 is designed to be carried and supported by the tine forming legs 9 and is shaped to present a slightly bowed contour as shown in Figs. 4 and 5. The guard plate 13 may be approximately 1 inch to 1½ inches in width and from three inches to five inches long, depending upon the overall size of the meat fork and the spacing of the tine forming legs. A hole 15 is formed in the guard plate adjacent to one end thereof through which one of the tine forming legs is snugly inserted. The diameter of the hole 15 may be such as to insure a snug friction fit with the leg inserted therethrough, and if desired the leg or the guard plate may be crimped or otherwise formed to obtain firm securement of the guard plate to the leg extending through the hole 15.

The other tine forming leg extends through a slotted hole 16 in the guard plate 13, the slotted hole 16 being of such size as to permit free movement of the leg extending therethrough over the full length of the slot. The slotted hole 16 is in such position that when the tine forming legs are in substantially parallel position, the leg extending through the slot 16 is substantially in contact with the inner end 17 of the slot, and when the legs are in their normally flared position, the leg extending through the slot will substantially contact the outer end 18 of the slot so as to thereby inhibit further flaring movement of the tine forming legs. The tine forming leg extending through the slot 16 may be provided with upper and lower struck out projections 19 which form therebetween a guideway for the guard plate, the projections 19 also providing a support for the guard plate.

In using this improved meat fork, the upper portions of the tine forming legs located between the knee points 7 and the guard plate 13 may be gripped by the fingers of the hand as shown in Fig. 2, and the tine forming legs compressed together so as to extend in substantially parallel position. When the tine forming legs have been thus compressed, the leg which extends through the elongated slot 16 will be positioned adjacent to the inner end 17 thereof and thus substantial parallelism of the legs insured. The lower portions of the tine forming legs may then be easily forced into the chunk of meat for a convenient distance and up to the position of the guard plate 13, the guard plate 13 protecting the hand and fingers from contact with the meat. Upon release of the hand from the upper portions of the tine forming legs, the legs will tend to spring apart toward their normally flared position and in such a manner that the lower meat gripping portions of the legs will be wedged into the meat chunk to firmly and rigidly grip the meat. The meat chunk can then be suspended and carried at the end of the meat fork, and the meat chunk can be rigidly held by means of the meat fork in a position where the meat may be easily sliced into uniform slices. When the desired handling of the meat chunk has been completed, the fork can be easily withdrawn by compressing the legs to a parallel position without rupture or deformation of the meat.

This improved meat fork is a utility instrument whereby meats and other food products may be gripped, handled and supported with the assurance that the fork will not slip or disengage the product to be handled and manipulated. The instrument can be economically manufactured at low cost, is simple and attractive in design and appearance, and can easily be washed, cleaned and otherwise kept in a sanitary condition. This improved meat fork is so designed that it will not tear or deform the meat when inserted into or withdrawn from the product.

While certain novel features of the invention have been disclosed herein, and are pointed out in the annexed claims, it will be understood that various omissions, substitutions and changes may be made by those skilled in the art without departing from the spirit of the invention.

What is claimed is:

1. An improved handling and holding fork for meat chunks and like food products which comprises a handle section, and a pair of resilient tine forming legs extending from said handle section, each of said tine forming legs being relatively straight throughout and terminating in a piercing point, said tine forming legs having knurled product gripping surfaces, said legs flaring from the handle section outwardly toward the piercing points thereof, and a guard plate supported by said legs in position between the handle section and the pointed ends thereof, one end of said guard plate being supported by one of said legs with the other leg extending through an elongated slot in the guard plate whereby said legs may be compressed from their normally flared position to a substantially parallel position when pressure is exerted upon said legs.

2. An improved handling and holding fork for meat chunks and like food products which comprises a metal rod formed and shaped to provide a generally U-shaped handle section presenting a base portion and side portions tapering towards each other from the base portion of the handle section and terminating in inbowed knee portions, and a pair of resilient tine forming legs extending from the knee portions, each of said tine forming legs being relatively straight throughout and terminating in a piercing point, said legs normally flaring from the knee portions outwardly towards the piercing points thereof, a handle block set within and supported by the handle section of said fork forming rod, and a guard plate supported by said legs and positioned between the knee portions and the piercing points thereof, one end of said guard plate being secured to one of said legs with the other leg extending through an elongated slot in the guard plate whereby said legs may be compressed from their normally flared position to a substantially parallel position when compressive pressure is exerted upon said legs.

3. An improved handling and holding fork for meat chunks and like food products which comprises a metal rod formed and shaped to provide a generally U-shaped handle section presenting a base portion and side portions tapering toward each other from the base portion of the handle section and terminating in inbowed knee portions, and a pair of resilient tine forming legs extending from said knee portions, each of said tine forming legs being relatively straight throughout and terminating in a piercing point, said tine forming legs normally flaring from said knee portions outwardly at an angle of from 5° to 15° with respect to the midsectional line of the fork, a handle block set within and supported by the handle section of said fork forming rod, and a guard plate having a curved contour supported by said legs and positioned between said knee portions and the piercing ends thereof, one end of said guard plate being secured to one of said legs with the other leg extending through an elongated slot in the guard plate whereby said legs may be compressed from their normally flared position to a substantially parallel position.

FREDERICK F. LAVELL.

REFERENCES CITED

The following references are of record in the file of this patent:

UNITED STATES PATENTS

| Number | Name | Date |
|---|---|---|
| 359,653 | Wettstein | Mar. 22, 1887 |
| 511,238 | Hieatzman | Dec. 19, 1893 |
| 606,372 | Bradley | June 28, 1898 |
| 2,007,237 | Adams | July 9, 1935 |
| 2,234,715 | Whitney | Mar. 11, 1941 |

FOREIGN PATENTS

| Number | Country | Date |
|---|---|---|
| 17,401 | Great Britain | Aug. 30, 1901 |